United States Patent
Toyonaga et al.

(10) Patent No.: US 6,326,577 B1
(45) Date of Patent: Dec. 4, 2001

(54) WIRE CUTTING ELECTRICAL DISCHARGE DEVICE AND METHOD FOR SAME

(75) Inventors: Tatsuo Toyonaga; Masateru Minamikawa, both of Yokohama (JP)

(73) Assignee: Sodick Co., Ltd., Yokohama (JP)

( * ) Notice: Subject to any disclaimer, the term of this patent is extended or adjusted under 35 U.S.C. 154(b) by 0 days.

(21) Appl. No.: 09/423,224
(22) PCT Filed: Mar. 4, 1999
(86) PCT No.: PCT/JP99/01033
§ 371 Date: Dec. 22, 1999
§ 102(e) Date: Dec. 22, 1999
(87) PCT Pub. No.: WO99/44779
PCT Pub. Date: Sep. 10, 1999

(30) Foreign Application Priority Data

Mar. 4, 1998 (JP) .................................................. 10-069478

(51) Int. Cl.$^7$ ....................................................... B23H 7/10
(52) U.S. Cl. ............................................................ 219/69.12
(58) Field of Search ........................................... 219/69.12

(56) References Cited

U.S. PATENT DOCUMENTS

| | | | |
|---|---|---|---|
| 4,298,781 | 11/1981 | Inoue | ................................. 219/69.12 |
| 6,028,282 | * 2/2000 | Toyonaga et al. | ................. 219/69.12 |

FOREIGN PATENT DOCUMENTS

| | | |
|---|---|---|
| 2-185321 | 7/1990 | (JP) . |
| 5-312657 | 11/1993 | (JP) . |
| 7-60552 | 3/1995 | (JP) . |
| WO98/39128 | * 9/1998 | (WO) . |

OTHER PUBLICATIONS

International Search Report.

* cited by examiner

Primary Examiner—Geoffrey S. Evans
(74) Attorney, Agent, or Firm—McDermott, Will & Emery; Paul Devinsky

(57) ABSTRACT

A wire cut electrical discharge processing device comprising a device (6) which takes up a wire electrode, the wire electrode (1) traveling along a wire conveying path; a servo motor (4B) which applies tension to the traveling wire electrode; a NC device which generates signals which indicate a set value for the tension; a force detector (9) which detects the tension applied to the wire electrode and generates signals which indicate the detected value; and a tension control device (13) which processes signals which indicate the set value of the tension and the signals which indicate the detected value of the tension and which supplies speed command signals which direct the speed of rotation of the servo motor. The tension control device comprises two continuously connected notch filters (19 and 20) which check different frequencies. The unnecessary frequency setting device (21) sets the minimum value of the unnecessary frequency for one of the notch filters and sets the maximum of the unnecessary frequency for the other notch filter.

6 Claims, 5 Drawing Sheets

WIRE CUTTING ELECTRICAL DISCHARGE DEVICE AND METHOD FOR SAME

FIELD OF THE INVENTION

The present invention relates to a wire cut electrical discharge device which processes a work piece by generating a discharge between a wire cut electrode and a work piece while conveying the wire electrode along a wire conveying path while a predetermined tension is applied to it. More particularly, the invention relates to a wire cut electrical discharge device which is provided with a device which controls the tension applied to the wire electrode while it travels along the wire conveying path.

BACKGROUND OF THE INVENTION

In most wire cut electrical discharge processing devices, the wire electrode travels in a direction which is nearly vertical to the X-Y plane between a pair of wire guides while one of the wire electrode and work piece moves on the X-Y plane relative to the other. During processing, a voltage pulse is applied to a gap which is formed between the wire electrode and the work piece and the work piece is processed by the wire by generating a discharge in this gap. This type of wire cut electrical discharge processing device is used for precise processing applications.

The wire electrode, typically having a 0.1 to 0.3 mm diameter, is conveyed from a wire spool through a pair of wire guides disposed respectively above and below the work piece, via a device comprising a number of pulleys which apply tension to the wire. In addition, the wire electrode is conveyed to an appropriate recovery device, usually via a wire take-up device comprising a number of pulleys. The wire take-up device is controlled so that the traveling speed of the wire electrode is maintained at a set value. The tension applying device is controlled so that the tension applied to the wire electrode is a set value. The tension on the wire electrode is set, for example, so that it corresponds to the diameter and material of the wire electrode as well as the type of processing. If the tension is set to a large value, good straightness of the wire electrode between the pair of wire guides is achieved. However, excessive force may cause the wire to break, which is undesirable.

OBJECTS OF THE INVENTION

It is an object of the present invention to provide a wire cut electrical discharge processing device which accurately maintains the tension on the wire electrode at a set value.

It is another object of the present invention to provide a wire cut electrical discharge processing device which reduces fluctuations in the tension on the wire electrode.

Yet another object of the present invention is explained partially in the explanation which follows and will partially become clear to one of skill in the art by practice of the invention.

In order to attain the above-mentioned and other objects, a wire cut electrical discharge processing device according to the present invention comprises a device which conveys the wire electrode so that the wire electrode travels along a conveying path, a servo motor which applies tension to the wire electrode while it travels, a NC device which generates signals which indicate the set value for the tension, a tension detection device which detects the tension applied to the wire electrode and generates signals which indicate the value detected, and a tension control device which revises the speed command signals which direct the rotating speed of the servo motor based on the difference between the set value of the tension and the detected value of the tension. The tension control device comprises two notch filters which stop the different frequencies which are continuously connected.

The tension control device may comprise an unnecessary frequency setting device which sets the minimum value of the unnecessary frequencies to one of the two notch filters and sets the maximum value of the unnecessary frequencies to the other of the two notch filters.

The wire cut electrical discharge processing method in the present invention which processes the work piece by generating a discharge in the gap between the wire electrode and the work piece while the wire travels along a conveying path while tension is applied to it by a motor, comprises:

a step of generating signals which indicate a set value of the tension to be applied to the wire electrode;

a step of conveying the wire electrode along a conveying path;

a step of generating speed command signals to direct the rotation speed of the motor;

a step of detecting the tension which is applied to the traveling wire electrode and generating signals which indicate the detected value;

a step of revising the speed command signals based on the difference between the set value and the detected value of the tension applied to the wire electrode;

a step of determining a the minimum value and a maximum of unnecessary frequencies which cause the force applied to the wire to fluctuate based on the signals which indicate the detected value of the tension applied to the wire electrode; and a step of providing a cascade connection between a notch filter which checks the minimum value of the unnecessary frequencies and a notch filter which checks a maximum value of the unnecessary frequencies.

DETAILED DESCRIPTION OF THE INVENTION

The wire cut electrical discharge processing device according to the present invention will now be described with reference to FIGS. 1 and 2.

Figure 1:
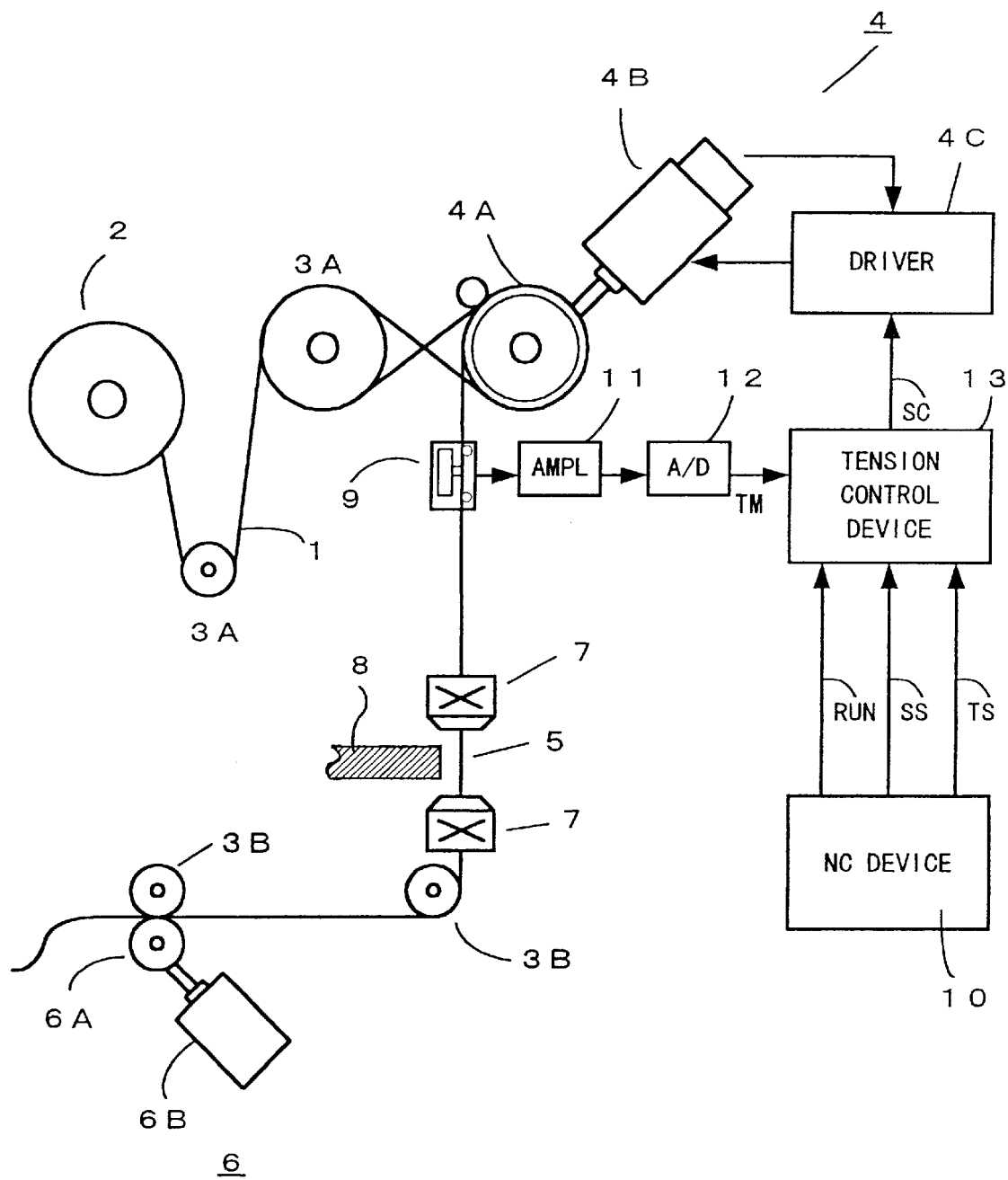
FIG. 1 is a schematic illustration of a the wire cut electrical discharge processing device according to the present invention.
Figure 2:
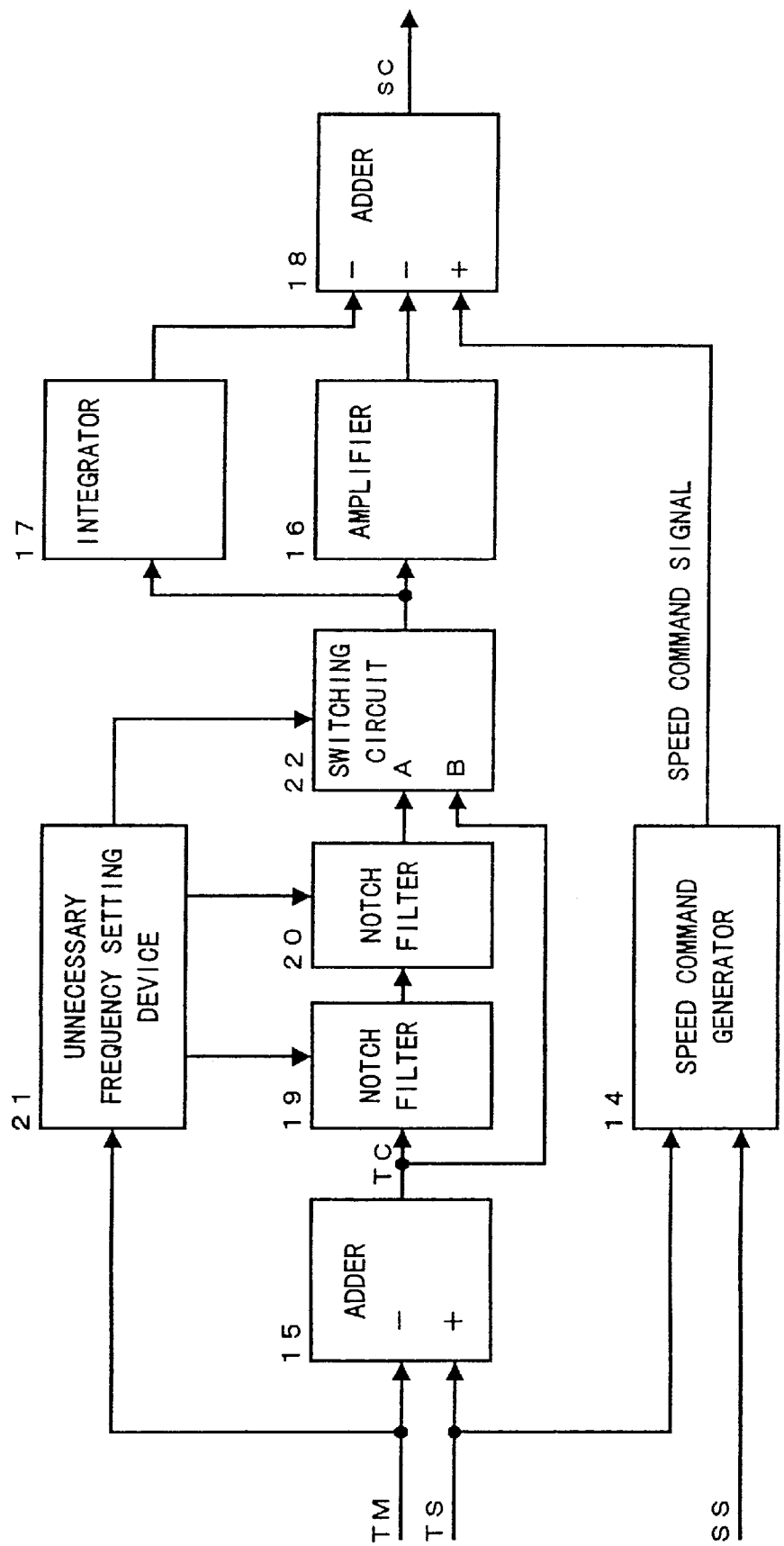
FIG. 2 is a block diagram of the force control device of FIG. 1.

A wire electrode 1 is conveyed to a pair of wire guides 7 from a wire bobbin 2 via a number of pulleys 3A, a brake pulley 4 and a tension detector 9 using a wire take up device 6, as illustrated in FIG. 1. The pair of wire guides 7 guides the wire electrode 1 as it travels relative to work piece 8 moveable along the X-Y plane. The upper wire guide 7 is moveable along the U-V plane, which is parallel with a working area X-Y plane, in order to carry out taper cutting on work piece 8. The work piece 8 is processed within a working area 5 which is formed between the wire guides 7. The wire take up device 6 conveys wire electrode 1 to the appropriate wire electrode recovery device (not shown in figure) via a number of pulleys 3 B. The wire take up device 6 comprises a pulley 6A which is disposed along the wire conveying path and a motor 6B which is linked to pulley 6A. The device which controls the traveling speed of the wire electrode (not shown in figure) determines the rotation speed of the motor 6B based on the set value which is stored in memory in NC device 10.

A tensioning device 4 applies tension to the wire electrode 1 which travels between the device 4 and the wire take up device 6 and that tension maintains the straightness of the wire electrode 1 as it travels between the pair of wire guides 7. For example, the appropriate set value of the tension is stored in memory inside NC device 10 according to the diameter and material of wire electrode 1 and the type of processing. The tensioning device 4 comprises brake pulley 4A which provides friction to wire electrode 1, a servo motor 4B which is linked to brake pulley 4A and a driver circuit 4C. A speed detector which detects the rotational speed of motor 4B is attached to servo motor 4B. The tension applied to wire electrode 1 is detected by a tension detector 9 which may comprise, for example, a distortion gauge. The output of the tension detector 9 is provided to a tension control device 13 using digital signals TM which indicate the tension on the wire electrode 1 passing through the amplifier 11 and analog digital converter 12. A tension control device 13 receives output signals RUN, TS and SS from NC device 10. The signal RUN directs the traveling motion of wire electrode 1. When the tension control device 13 receives the RUN signal, it commences operation. The signals TS and SS indicate the set values of wire tension and wire traveling speed, respectively. The tension control device 13 supplies a signal SC, which directs the rotational speed of servo motor 4B, to the driver circuit 4C. The driver circuit 4C supplies a current to servo motor 4B which corresponds to the signal SC.

The tension control device 13 will now be described in detail with reference to FIG. 2. The tension control device 13, which receives signals TS and SS, includes a speed command generator 14 which supplies a speed command signal indicative of the rotational speed of the servo motor 4B. The speed command generator 14 determines the motor rotational speed required to maintain the set value of tension on the wire electrode 1. The tension control device 13 further comprises an adder circuit 15, an amplifier 16, an integrator 17 and an adder 18. These elements modify the speed command signals based on any deviation between the set value and the detected value of the wire tension. The adder 15 receives signals the TS and TM and supplies a signal TC which indicate the difference between these values. The difference signal TC is supplied to one input of the adder 18 after passing through the amplifier 16 and is also supplied to another input of the adder 18 after passing through the integrator 17. The adder 18 modifies the speed command signal from speed command generator 14 and supplies the signal SC, which indicates the rotational speed of the servo motor 4B, to the driver circuit 4C.

Thus, the tension control device 13, the tensioning device 4, the wire electrode 1, the tension detector 9, the amplifier 11 and the analog/digital converter 12 comprise a feedback control system which has an inherent oscillation frequency. In the feedback control system, external forces may resonate with a force provided by an element such as a pulley which is positioned along the wire conveying path. This resonance may cause the tension on the wire electrode 1 to fluctuate. As a result of the fluctuations in tension, undesirable rectilinear flaws. which extend in the traveling direction of the wire electrode 1, may be left on the processed surface of the work piece 8.

An electrical filter, which suppresses the resonant frequencies of the feedback control system from the output signal TC of adder 15, is provided in the tension control device 13 in order to minimize fluctuations in tension which are caused by resonance.

Figure 3:
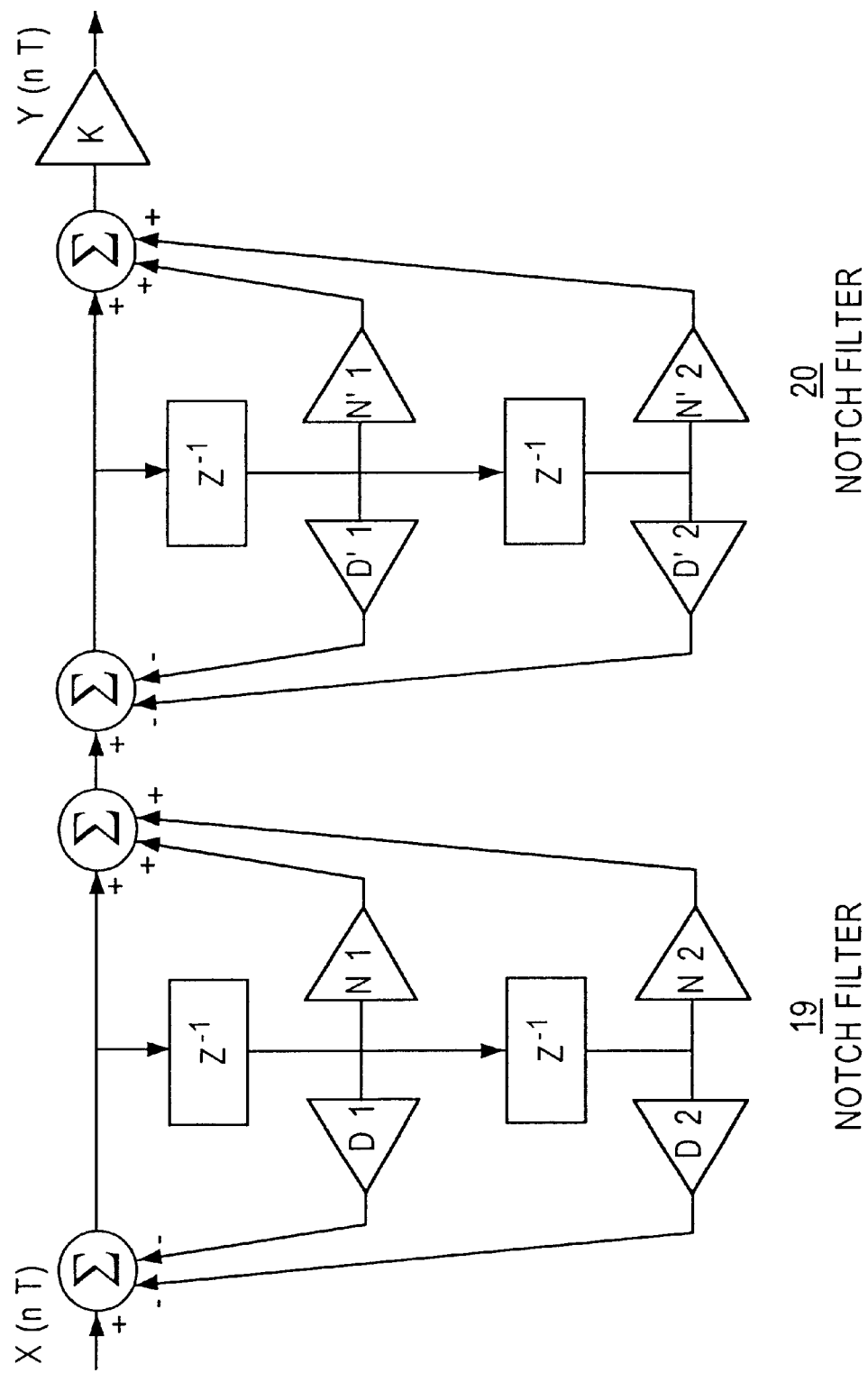
FIG. 3 is a diagram illustrating an example of the cascaded notch filters of FIG. 2.

The electrical filter device in the present invention includes two cascaded notch filters 19 and 20 which interrupt signals having frequencies in predetermined ranges. In the illustrated embodiment, the notch filters 19 and 20 are configured as digital, cascaded filters which carry out a recurrent differential equation, as illustrated in FIG. 3. The digital filters 19 and 20 are provided respectively with variable filter coefficients D1, D2, N1 and N2 and D1', D2', N1' and N2'. The digital filters 19 and 20 may carry out the functions of a notch filter or a low pass filter depending on the respective filter coefficients.

The unnecessary resonant frequencies will differ for the feedback control system depending on the diameter and the material of the wire electrode 1 being used. Moreover, the unnecessary resonant frequencies may change according to the length of the wire conveying path between tensioning device 4 and wire take up device 6. The length of this wire conveying path changes when the upper wire guide 7 indicated in FIG. 1 moves within the U-V plane during processing. Also, in these wire cut electric discharge processing devices in which neither the tensioning device 4 nor take up device 6 follows the motion of the wire guides 7, when the wire guides 7 move in a plane relative to the X-Y plane in which the work piece W is processed, the length of the wire conveying path changes. Applicant has found the relationship between the length of the wire conveying path and the resonant frequency, by experiments using 0.2 $\phi$ brass wire electrode. A A500 wire cut electrical discharge processing device manufactured by Sodick Co, Ltd. was used in the experiments.

The results are as follows:

| Length of wire conveying path (mm) | Resonant frequency (Hz) |
| --- | --- |
| approximately 2600 | 43.8 |
| approximately 2200 | 44.8 |
| approximately 1900 | 48.3 |

Applicant cascaded the notch filter 20 to the notch filter 19. The notch filter 20 suppressed the minimum estimated resonant frequency and the notch filter 20 suppressed the maximum estimated resonant frequency, taking into consideration changes in resonant frequency during processing.

The tension control device 13 may further comprise an unnecessary frequency setting device 21 which sets the frequencies over which the electrical filter device will suppress so that the electrical filter device reliably suppresses the unnecessary frequencies. The unnecessary frequency setting device 21 separates the TM signals into its frequency components using high speed Fourier transformation (FFT) and determines the frequency having the greatest amplitude when the length of the wire conveying path is at a maximum. The frequency band for which the notch filter 19 will suppress is set according to the frequency having the greatest amplitude. By the same token, the unnecessary frequency setting device 21 determines the frequency having the greatest amplitude when the length of the wire conveying path is at its smallest, and the frequency band over which the notch filter 20 will suppress is set according to the frequency having the greatest amplitude. In the practical embodiment illustrated, the unnecessary frequency setting device 21 supplies signals which indicate the four filter coefficients D1, D2, N1 and N2 to notch filter 19 and signals which indicate the four filter coefficients D1', D2', N1' and N2' to notch filter 20. The frequency bands over which the notch filters 19 and 20 will suppress are determined by the respective filter coefficients. the maximum estimated resonant frequency, taking into consideration changes in resonant frequency during processing.

Figure 4A:
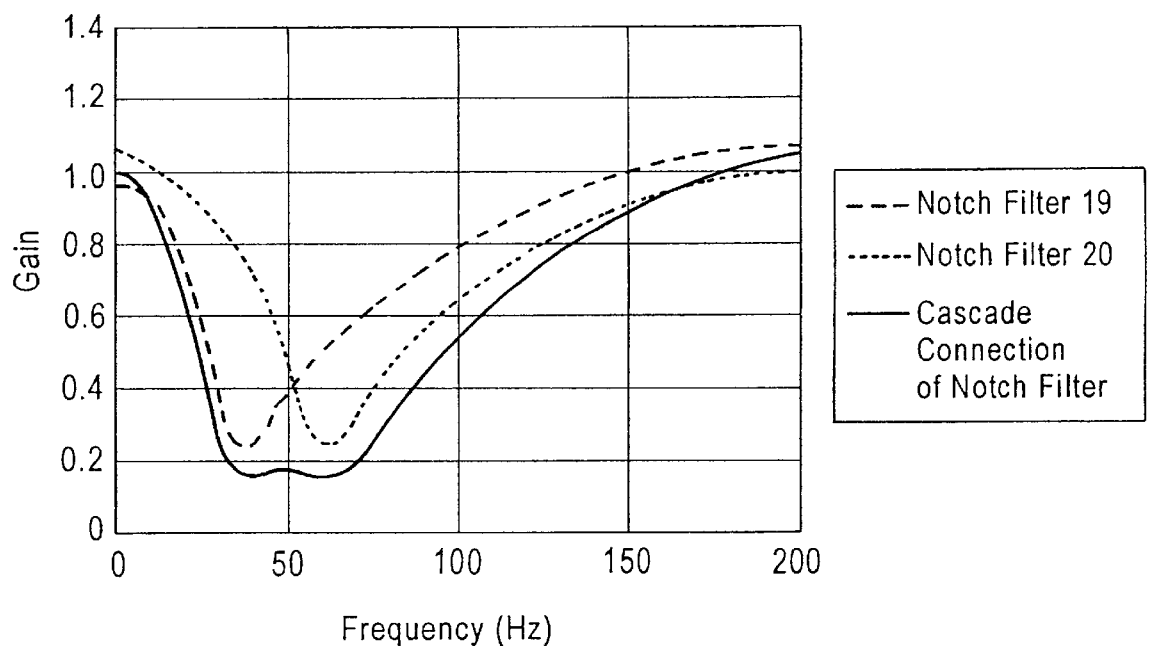
FIG. 4A is a graph which indicates the relationship between the frequency and the gain for a separate notch filter and a cascaded notch filters.
Figure 4B:
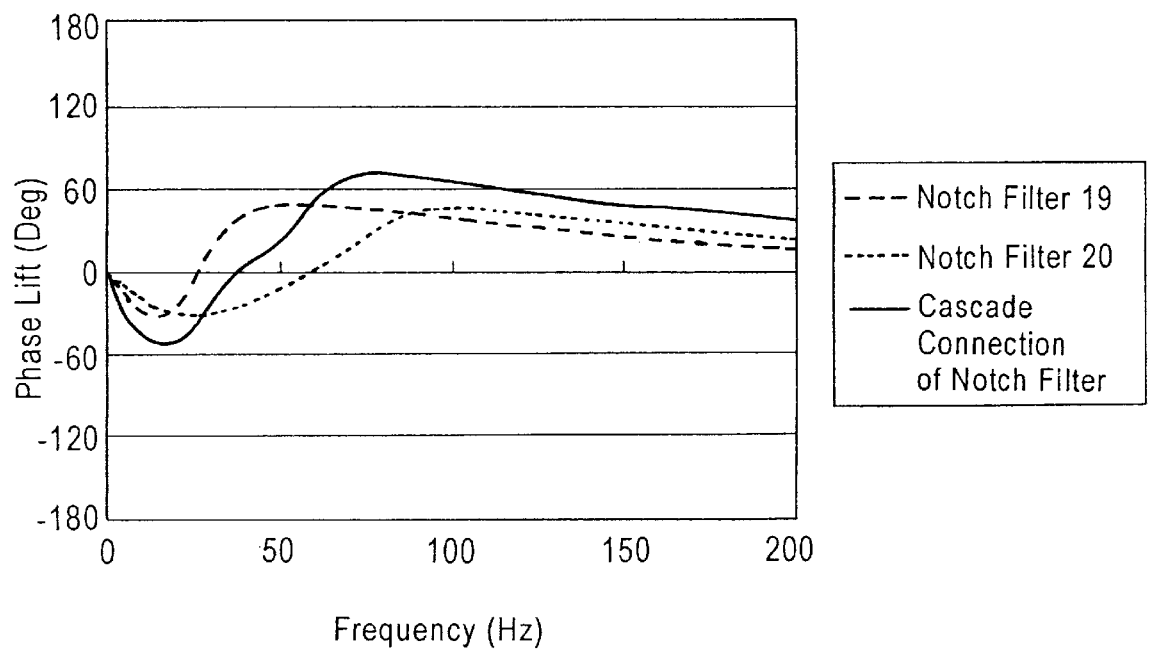
FIG. 4B is a graph which indicates the relationship between the frequency and the phase shift for a separate notch filter and a cascaded notch filters.

The cascade connection of the notch filters 19 and 20 should preferably have a sufficient gain of, for example 0.2 or less, to prevent oscillation across frequencies within a wide range, as indicated in FIG. 4A. Further, the overall phase shift of the cascade connection should preferably be only slightly larger than the phase shift of the separate notch filters 19 and 20, as indicated in FIG. 4B.

The tension control device 13 includes a switching circuit 22 for bypassing the notch filters 19 and 20 from the feedback control system until the unnecessary frequency setting device 21 supplies output signals to the notch filters 19 and 20. The switching circuit 22 has an input A which receives output signals from notch filter 20 and an input B which receives output signals from adder 15 and supplies either input A or input B to the amplifier 16 and integrator 17, according to the command signals from the unnecessary frequency setting device 21.

Figure 5:
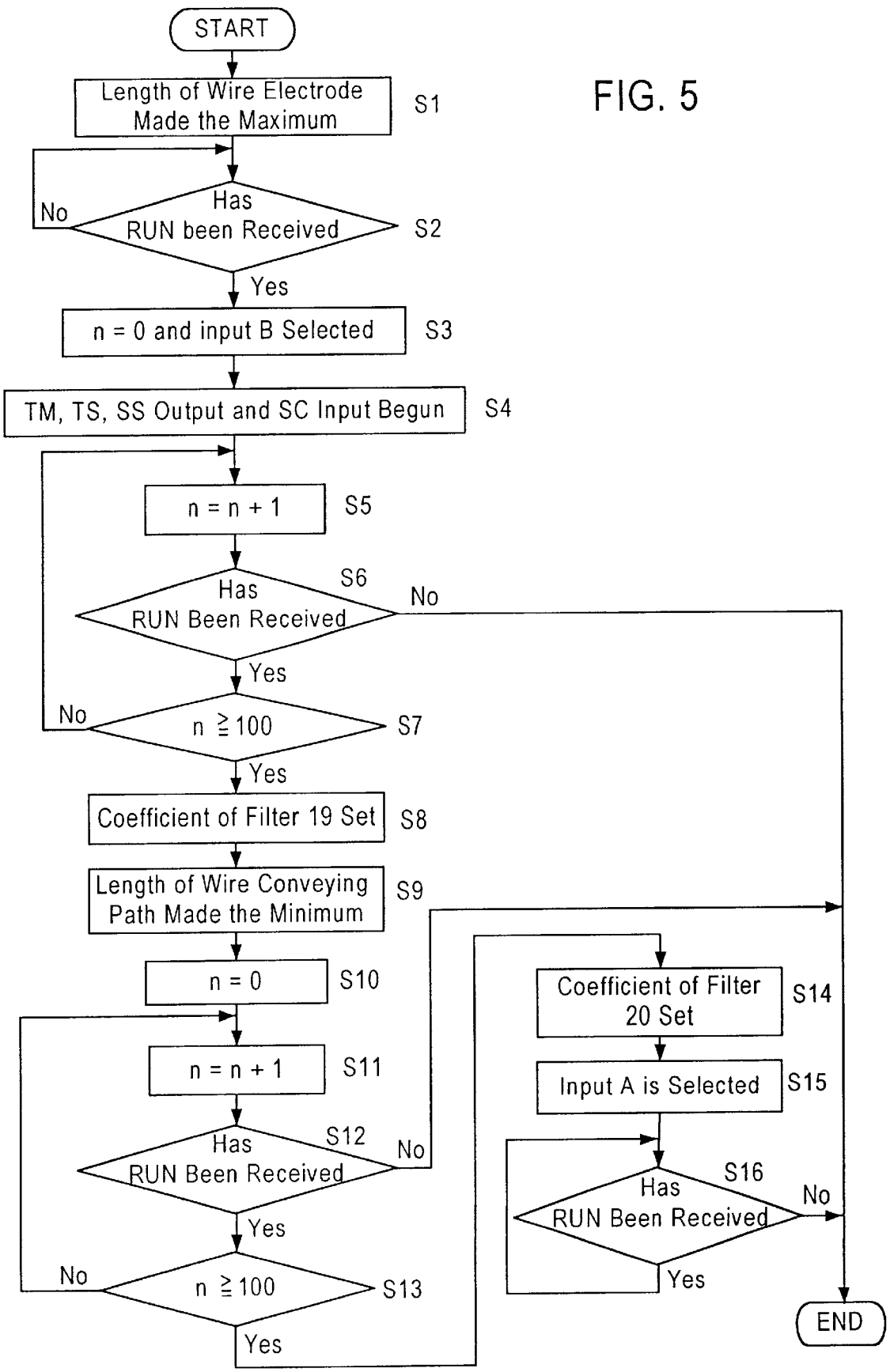
FIG. 5 is a flow chart illustrating the operation of the force control device of FIG. 2.

Next, the operation of the tension control device 13 will be described with reference to FIG. 5. The tension on and the traveling speed of the wire electrode are set in the NC device 10 before the tension control device 13 is operated and the set value is stored in memory. After the NC device 10 has moved the wire guide 7 in the X-Y plane and the U-V plane so that the length of the wire conveying path reaches its maximum in step S1, the process moves on to step S2. In step S2, the tension control device 13 starts operating in response to the signal RUN from the NC device 10. In step S3, the unnecessary frequency setting device 20 sets the size "n" of the input data to "0" and issues command signals to the switching circuit 21 so that the input B becomes the output signal of the switch 22. The notch filter 19 is excluded from the wire tension control feedback control system according to the command signals. In step S4, the tension control device 13 inputs signals TM, TS and SS and processing of these signals begins. The speed command generator 14 receives the signals TS and SS and supplies speed command signals indicating the rotational speed of servo motor 4B. These speed command signals are modified using the values which amplify any deviation between the set value and the detected value of the wire tension and the integrated value of that deviation. The adder 18 starts to output the signal SC which indicates the speed command signals which have been modified. The unnecessary frequency setting device 21 inputs the digital signal TM and in step S5 collects data while incrementing one by one, the size "n" of the data which expresses the wire tension. In step S6, when the signal RUN is received while the unnecessary frequency setting device 21 collects data which expresses the wire tension, the operation of the tension control device 13 is completed. In step S7, when the size "n" of the data reaches 100, the operation goes on to step S8. In step S8, the unnecessary frequency setting device 21 processes the collected data, determines the number of inherent oscillations in the feedback control system and sets the filter coefficient of the notch filter 19. In step S9, after the wire guide 7 has been moved in the X-Y plane and the U-V plane by the NC device 10 so that the length of the wire conveying path reaches its minimum. the operation moves on to step S10. In step S10, the unnecessary frequency setting device 21 again sets the size "n" of the input data to "0". In steps S11 to S14, the unnecessary frequency setting device 21 again collects data which expresses the wire tension, finds the inherent number of oscillations in the feed back control system, and sets the filter coefficients of notch filter 20. Thus, the setting of the filter coefficient for the two notch filters 19 and 20 is completed. In step S15, the unnecessary frequency setting device 21 issues command signals which direct that switching circuit 22 to supply the input A signal as the output. As a result, the cascade connection of notch filters 19 and 20 is supplied to the feedback control system. Operation of the tension control device 13 continues until the signal RUN is no longer received, in step S16.

The present invention should not be construed to be restricted to the precise form or embodiment disclosed. It is clear that referring to the above description a great many improvements and variations are possible. In addition, the position of the two cascaded notch filters 19 and 20 is not restricted to the practical embodiment of FIG. 2. The cascaded filters may also be provided anywhere in the feedback control loop where the speed command signal, SC, may be modified based on the difference in the detected value and the set value of the wire tension.

The practical embodiment illustrated and described was selected in order to explain the essence of this invention and its practical application. The scope of the invention should only be defined according to the scope of the appended patent claim.

What is claimed is:

1. A wire cut electrical discharge processing device for processing a workpiece by generating a discharge between a wire electrode and a work piece, said wire cut electrical discharge processing device having a wire transport path and comprising:

a wire take up device for pulling the wire electrode through the wire transport path;

a servo motor for applying tension to the wire electrode;

an NC device for generating a signal indicative of a set value of wire tension;

a tension detector for detecting the tension applied to the wire electrode and generating a signal indicative of the detected value;

a tension control device for controlling the rotational speed of the servo motor on the basis of the signal indicative of a set value of wire tension and the signal indicative of the detected value of wire tension; and wherein the tension control device includes at least two notch filters each of which suppresses components of different unnecessary frequencies in the signal indicative of the detected value of wire tension.

2. The wire cut electrical discharge processing device according to the claim 1, wherein the tension control device includes an unnecessary frequency setting device which sets different unnecessary frequencies for the at least two notch filters.

3. The wire cut electrical discharge processing device according to the claim 1, wherein the at least two notch filters are connected in cascade.

4. The wire cut electrical discharge processing device according to the claim 1, further comprising a brake pulley, the servo motor being linked to the brake pulley to provide friction against the wire electrode.

5. The wire cut electrical discharge processing device according to the claim 1, wherein the tension control device includes a first adder which generates signal indicative of difference between the signal indicative of a set value of wire tension and the signal indicative of the detected value of wire tension, and a second adder which modifies the rotational speed of the servo motor based on the signal indicative of the difference.

6. A method of controlling the tension of a wire electrode in a wire cut electrical discharge processing device in which the wire take up device through a tension pulley linked to a servo motor, said method comprising the steps of:

setting the tension and the traveling speed of the wire electrode;

detecting the tension in the wire electrode and generating a signal indicative of the detected tension;

generating a speed command signal indicative of the rotational speed of the servo motor according to the set tension and the set traveling speed;

modifying a speed command signal using the signal indicative of the detected tension;

determining maximum and minimum resonant frequencies which causes the wire electrode to fluctuate while changing the length of the conveying path between the tension pulley and the wire take up device;

cascading at least two notch filters wherein one of the at least two notch filters suppresses components of the maximum resonant frequency in the signal indicative of the detected tension, and another of the at least two notch filters suppresses components of the minimum resonant frequency in the signal indicative of the detected tension.

* * * * *